United States Patent
Zeng et al.

(10) Patent No.: US 9,262,454 B2
(45) Date of Patent: Feb. 16, 2016

(54) WEB PAGE RETRIEVAL METHOD AND DEVICE

(71) Applicant: Alibaba Group Holding Limited, George Town (KY)

(72) Inventors: Jianyuan Zeng, Hangzhou (CN); Weiqing Kong, Hangzhou (CN); Haiyu Hang, Hangzhou (CN)

(73) Assignee: Alibaba Group Holding Limited (KY)

( * ) Notice: Subject to any disclaimer, the term of this patent is extended or adjusted under 35 U.S.C. 154(b) by 189 days.

(21) Appl. No.: 13/759,774

(22) Filed: Feb. 5, 2013

(65) Prior Publication Data

US 2013/0204879 A1    Aug. 8, 2013

(30) Foreign Application Priority Data

Feb. 7, 2012  (CN) .......................... 2012 1 0026812

(51) Int. Cl.
*G06F 17/30* (2006.01)

(52) U.S. Cl.
CPC .... *G06F 17/30312* (2013.01); *G06F 17/30864* (2013.01)

(58) Field of Classification Search
CPC ................................................ G06F 17/30312
See application file for complete search history.

(56) References Cited

U.S. PATENT DOCUMENTS

| 5,010,478 | A  | * | 4/1991  | Deran |
| 5,761,652 | A  | * | 6/1998  | Wu et al. |
| 5,842,197 | A  | * | 11/1998 | Ho |
| 6,144,983 | A  | * | 11/2000 | Klots et al. ..................... 718/104 |
| 6,789,252 | B1 | * | 9/2004  | Burke et al. ................... 717/100 |
| 7,103,605 | B1 | * | 9/2006  | Hazi et al. |
| 7,809,672 | B1 | * | 10/2010 | Tenorio ...................... 705/26.64 |
| 8,260,771 | B1 | * | 9/2012  | Ortega et al. ................. 707/723 |
| 8,290,822 | B2 |   | 10/2012 | Gade et al. |
| 2002/0152133 | A1 | * | 10/2002 | King et al. ..................... 705/26 |

(Continued)

FOREIGN PATENT DOCUMENTS

| JP | H10242964  | 9/1998 |
| JP | 2001067369 | 3/2001 |

(Continued)

OTHER PUBLICATIONS

Holte, Insertion Into a B-Tree, Dec. 24, 2009.*

(Continued)

*Primary Examiner* — William Spieler
(74) *Attorney, Agent, or Firm* — Van Pelt, Yi & James LLP

(57) ABSTRACT

Embodiments of the present application relate to a web page retrieval method, a web page retrieval device, and a computer program product for retrieving a web page. A web page retrieval method is provided. The method includes receiving a query, retrieving an attribute identifier of a web page to be retrieved and a query range related to the attribute identifier, based on the query, obtaining a range of attribute values, determining whether an intersection between the range of attribute values to be retrieved and a plurality of index ranges established in advance in a system receiving the inputted query exists, in the event that the intersection exists, retrieving a web page relating to intersecting index ranges, the attribute identifier of the web page corresponding to the attribute identifier of the web page to be retrieved, and the attribute values intersecting the query range, and returning the retrieved web page.

20 Claims, 8 Drawing Sheets

(56) References Cited

U.S. PATENT DOCUMENTS

| | | |
|---|---|---|
| 2003/0120647 A1 | 6/2003 | Aiken et al. |
| 2006/0064411 A1* | 3/2006 | Gross et al. ............... 707/3 |
| 2007/0106666 A1* | 5/2007 | Beckerle et al. ........... 707/7 |
| 2007/0255696 A1* | 11/2007 | Desbarats ................. 707/3 |
| 2008/0059281 A1 | 3/2008 | Tower et al. |
| 2008/0071773 A1 | 3/2008 | Gross |
| 2011/0173177 A1 | 7/2011 | Junqueira et al. |
| 2012/0109990 A1 | 5/2012 | Yamasaki |
| 2012/0215783 A1 | 8/2012 | Musgrove et al. |

FOREIGN PATENT DOCUMENTS

| | | |
|---|---|---|
| JP | 2003288367 | 10/2003 |
| JP | 2010049658 | 3/2010 |
| JP | 2011170791 | 9/2011 |

OTHER PUBLICATIONS

Paul et al., Optimized Entity Attribute Value Model—A Search Efficient Representation of High Dimensional and Sparse Data, Jul. 6, 2011.*

Winand, Concatenated Indexes, Nov. 15, 2011.*

\* cited by examiner

WEB PAGE RETRIEVAL METHOD AND DEVICE

CROSS REFERENCE TO OTHER APPLICATIONS

This application claims priority to People's Republic of China Patent Application No. 201210026812.4 entitled WEB PAGE RETRIEVAL METHOD AND DEVICE, filed Feb. 7, 2012 which is incorporated herein by reference for all purposes.

FIELD OF INVENTION

This application relates to a web page retrieval method and device.

BACKGROUND OF THE INVENTION

In the field of internet search technology, searching for products using e-commerce search engines in e-commerce websites generally utilize attributes possessed by many products. The attributes can be price, date of manufacture, etc. However, for certain targeted attributes such as "inside diameter" and "outside diameter," the targeted attributes may be relevant for special products such as "bearings" but irrelevant for other products. Therefore, it is difficult for targeted attributes to be used for generic query purposes.

Generally, a plurality of web pages are stored in a search engine system. Each web page includes a comprehensive description of standard products, generic attributes such as the price, header, date of manufacture, etc., and user-defined attributes or non-generic attributes. For example, an attribute possessed by all products, such as price and place of origin, is referred to as a generic attribute, and an attribute possessed by certain specific products, such as inside diameter, outside diameter and thickness, is referred to as a non-generic attribute.

Some attribute-based product retrieval technologies retrieve attributes stored on web pages. Attribute information relating to the attributes stored in the web pages can be formatted using XML. The formatted attribute information has the same number of attributes recorded on each web page. For example, assuming that web pages A, B, and C describe products A, B, and C, respectively. Product A has two corresponding attributes: price and date of manufacture, product B has two corresponding attributes: price and date of manufacture, and product C has three corresponding attributes: price, date of manufacture, and inside diameter. Because product C has the non-generic attribute "inside diameter," which is not possessed by products A and B, in order to implement a formatted storage of the attribute information for products A, B and C, a field can be added to web pages A and B to include the attribute "inside diameter," and the attribute "inside diameter" can have a value of "0" to indicate that the product described on the corresponding web page does not possess the attribute. For example, products A, B, and C can have the following formatted storage information:

Web page A: "price", 100; "date", 2001-1-1; "inside diameter", 0;

Web page B: "price", 200; "date", 2002-1-1; "inside diameter", 0; and

Web page C: "price", 300; "date", 2003-1-1; "inside diameter", 50.

Based on the formatted storage scheme described above, when a product retrieval is based on a certain attribute, a query can be performed by using the attribute as the query entry. For example, when the product retrieval is based on the non-generic attribute of inside diameter, index ranges, such as "1-50" and "50-100," can be established for the "inside diameter" attribute. Then, a query of the field "inside diameter" recorded on each web page is performed based on the above index ranges.

Regarding the above storage scheme, when a web page newly stored in the system possesses an attribute not possessed by previously stored web pages, a corresponding field for each existing web page to record the attribute can be added, in order to implement the formatted storage and enable retrieval based on the newly-added attribute. For example, product D newly stored in the system has the corresponding attributes: "price", "date", "inside diameter", and "outside diameter," which includes a field not found in web pages A, B, and C. Thus, an additional field corresponding to the attribute "outside diameter" can be added to web pages A, B, and C. The attribute "outside diameter" for web pages A, B, and C can be assigned a value of "0" to indicate that the product described on the corresponding web page does not possess the attribute. The specific records can be described as follows:

Web page A: "price", 100; "date", 2001-1-1; "inside diameter", 0; "outside diameter", 0;

Web page B: "price", 200; "date", 2002-1-1; "inside diameter", 0; "outside diameter", 0;

Web page C: "price", 300; "date", 2003-1-1; "inside diameter", 50; "outside diameter", 0;

Web page D: "price", 400; "date", 2004-1-1; "inside diameter", 60; "outside diameter", 100.

Because the web page newly stored in the system possesses an attribute not previously possessed by the other stored web pages, a field corresponding to the new attribute is added to the existing web pages to record the new attribute. Thus, a large number of fields with little use for expressing attributes may be stored in the system resulting in data redundancy and an unnecessary use of system resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
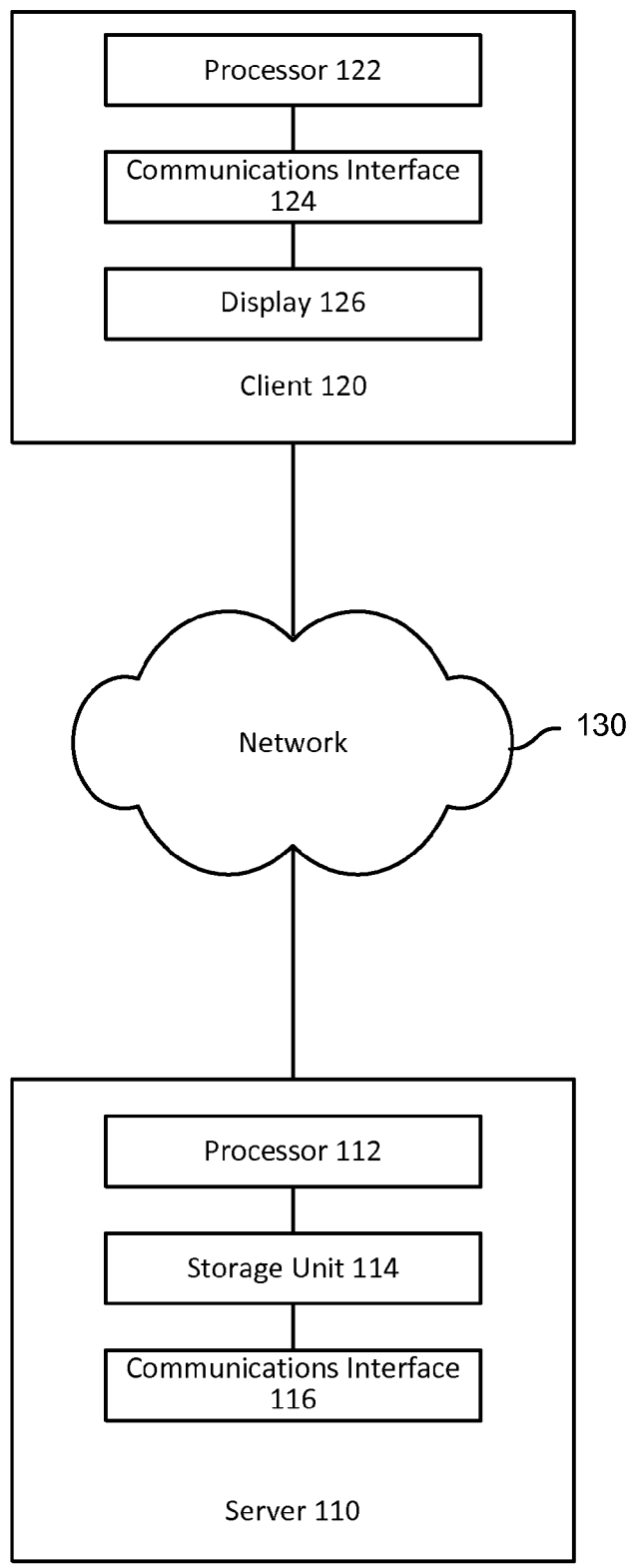
FIG. 1 is a block diagram illustrating an embodiment of a web page retrieval system.

FIG. 1 is a block diagram illustrating an embodiment of a web page retrieval system. The web page retrieval system 100 comprises: a server 110 and one or more clients 120 connected via a network 130. The server 110 includes a processor 112 such as a central processing unit (CPU), a microcontroller unit (MCU) microprocessor or a field-programmable gate array (FPGA) programmable logic device, a storage unit 114 configured to store data, and a communications interface 116 configured to communicate with the one or more clients 120 via the network 130. The client 120 includes a processor 122 such as a MCU microprocessor, a communications interface 124 configured to communicate with the server 110 via the network 130, and a display 126 configured to interact with the user. A "web page retrieval system" can refer to any hardware component or combination of hardware components configured to execute software, firmware, or microcode in order to achieve functions. The web page retrieval system 100 can be a distributed system to implement distributed functionality.

The server 110 is configured to retrieve an attribute identifier of a web page to be retrieved and a query range related to the attribute identifier, based on an inputted query by a user from the client 120.

The server 110 is configured to obtain, using a processor 112, a range of attribute values to be retrieved based on the attribute identifier of the web page to be retrieved and the query range, determine, using the processor 112, whether an intersection between the range of attribute values to be retrieved and a plurality of index ranges established in advance in the server 110 exists. In the event that the intersection between the range of attribute values to be retrieved and the plurality of index ranges exists, the server 110 is configured to retrieve at least one web page relating to intersecting index ranges, the attribute identifier of the at least one web page corresponding to the attribute identifier of the web page to be retrieved, and the attribute values relating to the attribute identifier of the at least one web page intersecting the query range; and return the at least one retrieved web page as the retrieval results.

Figure 2:
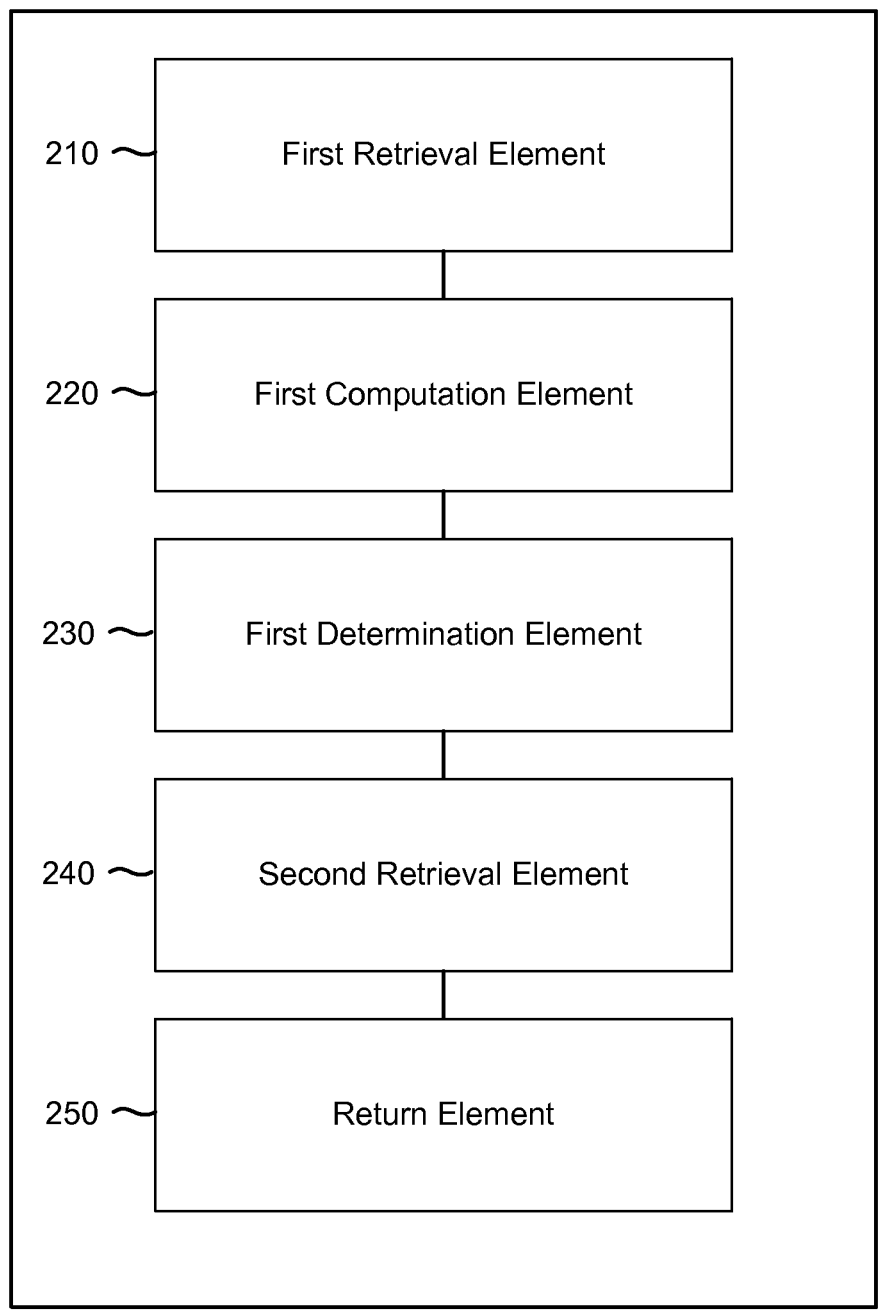
FIG. 2 is a block diagram illustrating an embodiment of a web page retrieval device.

FIG. 2 is a block diagram illustrating an embodiment of a web page retrieval device. The server 110 or the client 120 can include the web page retrieval device 200.

The web page retrieval device 200 includes a first retrieval element 210, a first computation element 220, a first determination element 230, a second retrieval element 240, and a return element 250.

The first retrieval element 210 is configured to retrieve an attribute identifier of a web page to be retrieved and a query range related to the attribute identifier based on an inputted query. For example, the query may be inputted by a user's selection from a pull-down menu provided by a web page for the purposes of searching. Assuming that the user chooses to look up products having a "price" attribute of "25-60" based on previously defined mapping relationships, the attribute identifier corresponding to "price," id=1, can be obtained, and the query range related to the attribute identifier, "25-60," can be retrieved.

In some embodiments, a web page has one or more attribute identifiers, and corresponding value ranges for each attribute identifier. Possible ranges of attribute ID/values for all the web pages that are available for the search are pre-established. The pre-established ranges are referred to as indexed ranges. In some embodiments, the ranges of attribute ID/values are determined according to the following: the web pages are sorted according to the attribute identifiers first, then according to corresponding minimum values (such that a web page with the attribute identifier of 5 and a value range of (3-10) has a position in the sorted list that is before another web page with the attribute identifier of 5, and a value range of (6-12), but is after another web page with the attribute identifier of 4 and a value range of (7-8). The sorted pages are divided into N groups. Within each group, the lowest attribute identifier and the corresponding minimum value are combined into a value, and the highest attribute identifier and the maximum value are combined into another value. For example, assume that the attribute identifier and the value are both 32 bit values, the attribute identifier is used as the higher 32 bit of a 64-bit value and the minimum (or maximum) value is used as the lower 32 bit of the 64-bit value. Accordingly, each group of sorted pages maps to two 64-bit values, which represents the range for each group of pages.

The first computation element 220 is configured to obtain a range of attribute values to be retrieved based on the attribute identifier of the web page to be retrieved and the query range related to the attribute identifier. In some embodiments, the range of attribute values to be retrieved is determined in a manner similar to the values corresponding to the groups of pages, i.e., the lowest attribute identifier is used as the higher 32 bit of a 64-bit value and the corresponding minimum value of the lowest attribute identifier is used as the lower 32 bit of a 64-bit value; the highest attribute identifier is used as the higher 32 bit of another 64-bit value and the corresponding maximum values of the highest attribute identifier is used as the lower 32 bit of the other 64-bit value. The first determination element 230 is configured to determine whether an intersection between the range of the attribute values to be retrieved and a plurality of index ranges determined in advance in the device receiving the query exists. For example, assuming that using the technique described above, the existing web pages are divided into four ranges, specifically, "0-15", "20-50," "84-100," and "259-300." For the range of attribute values to be retrieved corresponding to "25-90," an intersection with the index ranges of "20-50" and "84-100" exists.

The second retrieval element 240 is configured to in the event that the intersection exists between the range of the attribute values to be retrieved and the plurality of index ranges, retrieve a web page in an intersecting index range, the web page having an attribute identifier corresponding to the attribute identifier of the web page to be retrieved and the query range intersecting attribute value of the web page in the intersecting index range. The return element 250 is configured to return the retrieved web pages as a retrieval result.

The attribute identifier of the web page to be retrieved can correspond to one of the query conditions. The range of the attribute values to be retrieved is obtained based on the attribute identifier of the web pages to be retrieved and the query range related to the attribute identifier. Accordingly, a first screening can be performed, e.g., selecting from among the device's predetermined index ranges of the index ranges for which an intersection with the range of attribute values to be retrieved exists, and selecting web pages corresponding to the intersecting index ranges. Subsequently, a second screening can be performed to identify among the selected web pages ones satisfying both of the query conditions of product identifier and query range. The resulting pages are output as the retrieval results. In the technique described above, the index ranges established in advance by the device are no longer established relating to any single attribute. Instead, the attribute identifier relates to one factor for establishing the index ranges, so that index ranges can be established relating to a plurality of attributes. Accordingly, unified queries can be made within a set of web pages having different attributes. On the other hand, conventional queries are made within the same attribute, such as, for example, price. Thus, when a web page that is newly stored in the device possesses an attribute not possessed by the other previously stored web pages, adding a corresponding field for each existing web page to record the attribute is not needed. Thus, data redundancy and waste of system resources caused when retrieving non-generic attributes is reduced while implementing a retrieval of a range of attributes.

Figure 3:
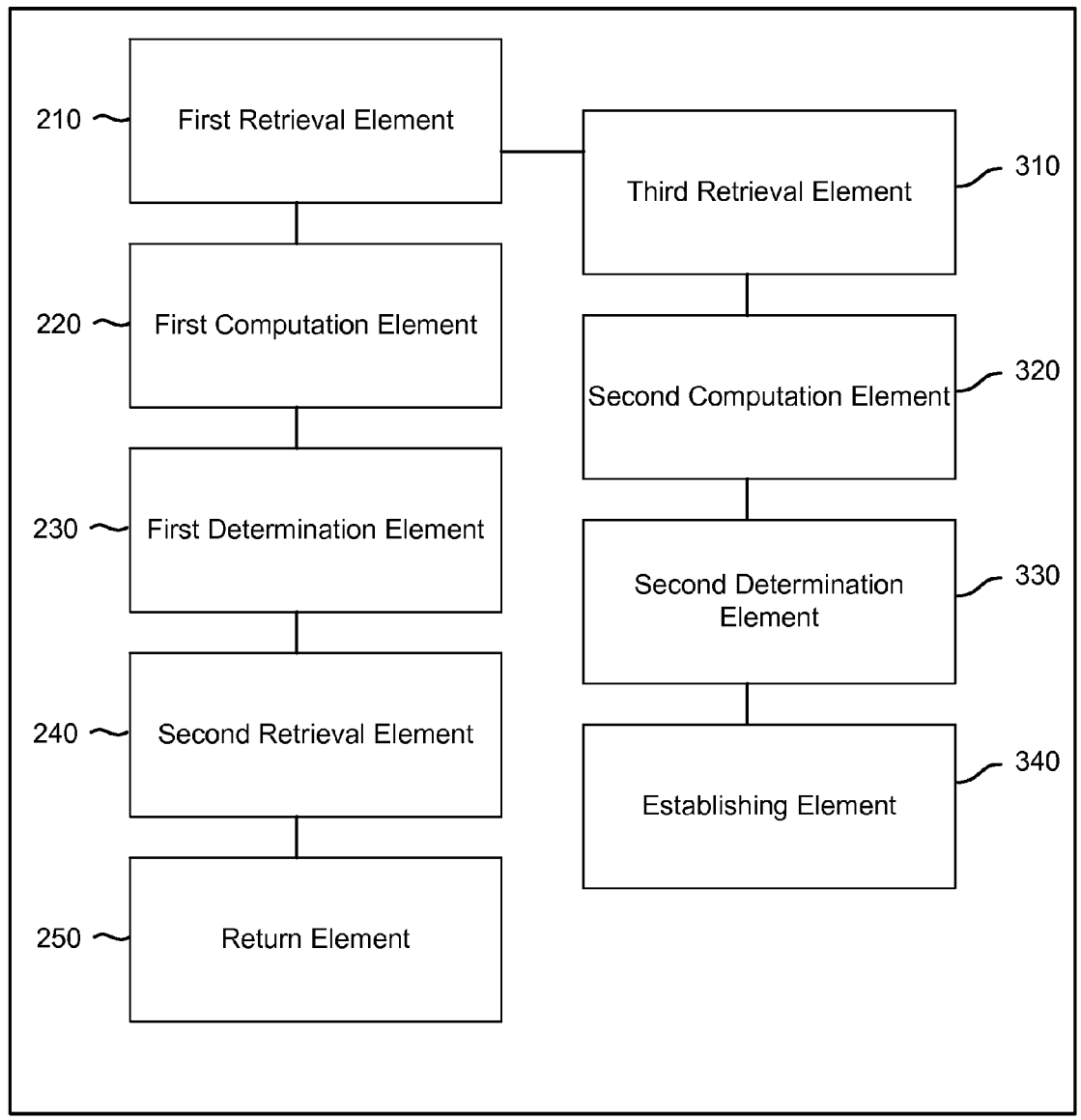
FIG. 3 is a block diagram illustrating another embodiment of a web page retrieval device.

The present application also can establish mapping relationships between index ranges and web pages to be processed in order to retrieve a range of non-generic attributes contained in the web pages. FIG. 3 is a block diagram illustrating another embodiment of a web page retrieval device. The web page retrieval device 300 includes a third retrieval element 310, a second computation element 320, a second determination element 330, and an establishing element 340 in addition to the elements included in the web page retrieval device 200 of FIG. 2.

The third retrieval element 310 is configured to prior to retrieving the attribute identifier of the web page to be retrieved and the query range related to the attribute identifier based on the inputted query, retrieve attribute identifiers and attribute values of a plurality of web pages to be processed.

The second computation element 320 is configured to obtain a range of the attribute values of the web pages to be processed based on the attribute identifiers and the attribute values of the web pages to be processed.

The second determination element 330 is configured to determine whether an intersection between the range of attribute values of the web pages to be processed and the plurality of index ranges determined in advance exists.

The establishing element 340 is configured to in the event that the intersection exists, establish a mapping relationship between an intersecting index range and the web pages to be processed, and in the event that the intersection does not exist, the process ends.

Figure 4:
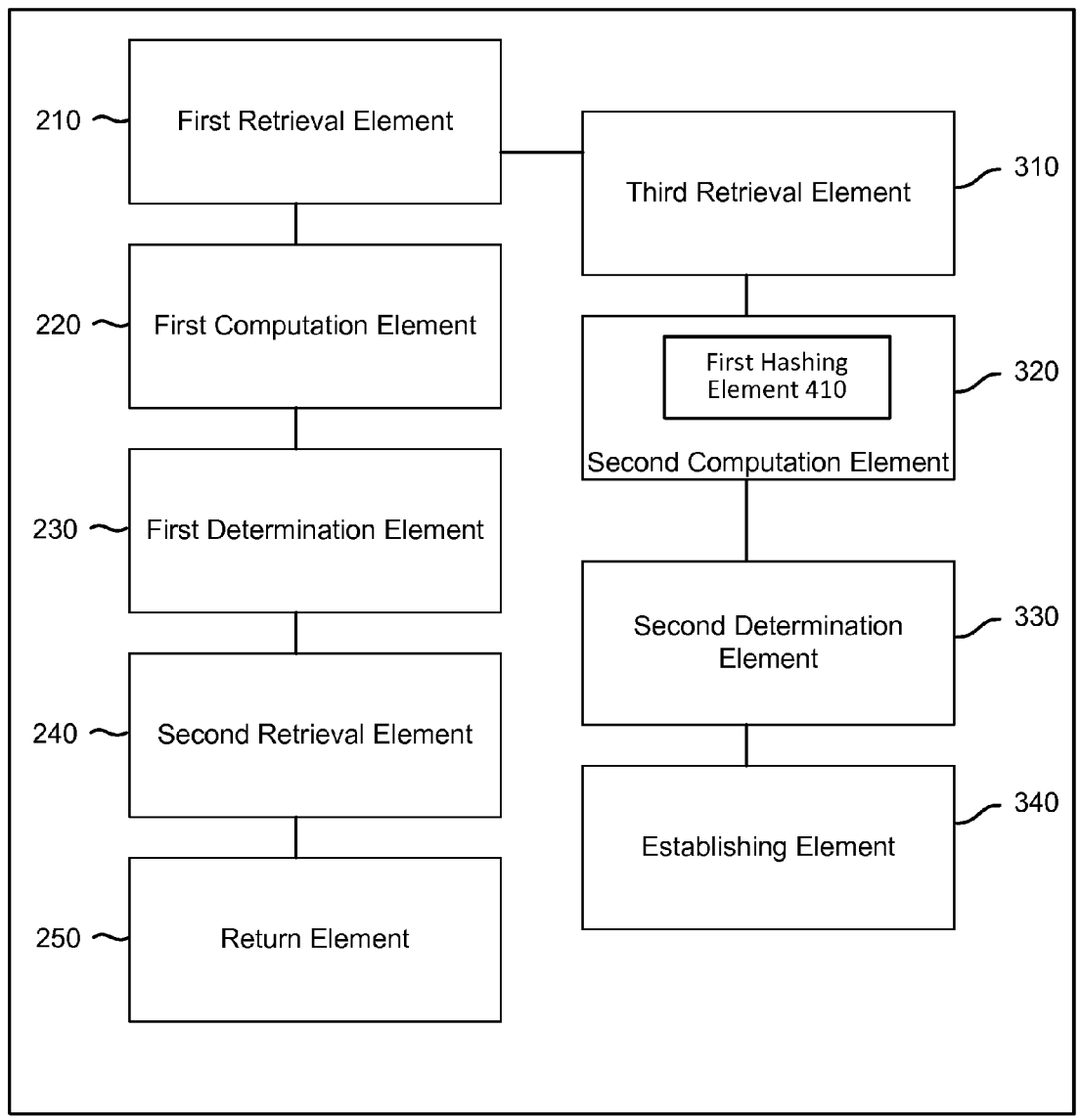
FIG. 4 is a block diagram illustrating yet another embodiment of a web page retrieval device.

FIG. 4 is a block diagram illustrating yet another embodiment of a web page retrieval device. The web page retrieval device 400 includes the second computation element 320 that includes a first hashing element 410. The other elements of the web page retrieval device 400 correspond with similar elements of the web page retrieval device 300. The first hashing element 410 is configured to hash the attribute identifiers and the attribute values of the web pages to be processed to obtain the range of attribute values of the web pages to be processed.

Figure 5:
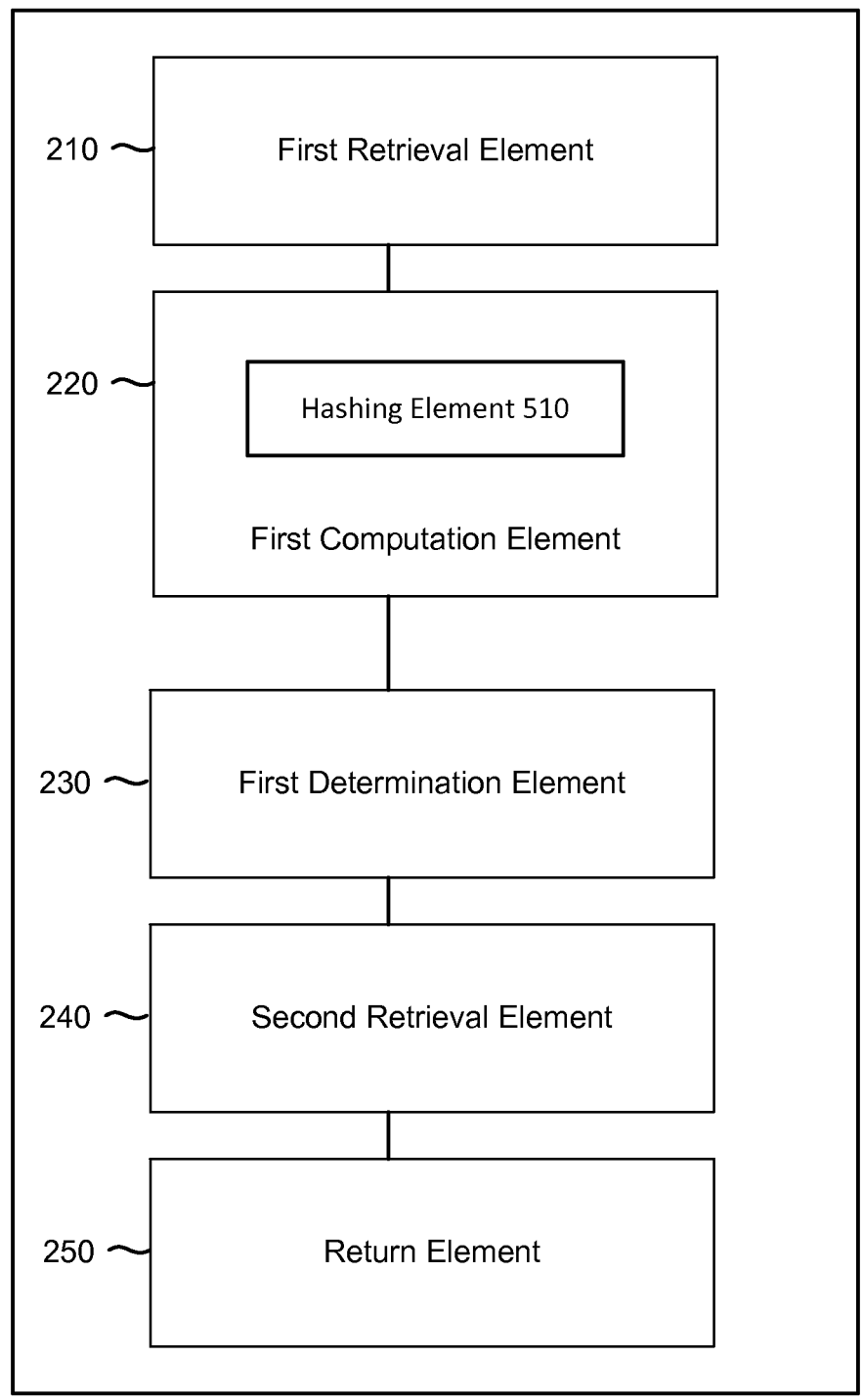
FIG. 5 is a block diagram illustrating yet another embodiment of a web page retrieval device.

FIG. 5 is a block diagram illustrating yet another embodiment of a web page retrieval device. The web page retrieval device 500 includes the first computation element 220 that includes a second hashing element 510. The other elements of the web page retrieval device 500 correspond with similar elements of the web page retrieval device 200. The second hashing element 510 is configured to hash the attribute identifier of the web page to be retrieved and the query range related to the attribute identifier to obtain the range of attribute values to be retrieved.

The attribute values can correspond to discrete values or predetermined numerical ranges.

In some embodiments, query ranges can be established beforehand. Assume that there are 40 web pages and attribute identifiers (ID=1, ID=2, ID=3, . . . , ID=N) where each attribute identifier has a range of values. The web pages are sorted according to the attribute identifiers then the value ranges, forming a sorted list of web pages (A1, A2, . . . , A40) The list of web pages are divided into a set of groups. For example, the web pages can be divided up into 4 groups A1-A10, A11-A20, A21-A30 and A31-A40.

After the sorting process is completed, one group of web pages can be selected, for example, group 1 may include A1-A10. For Group 1, A1 has the lowest attribute identifier ID=5 and the corresponding minimum value is 6, A2 has an attribute identifier ID=6, etc. A10 has an attribute identifier ID=11 and the corresponding maximum value is 20. So the range of group 1 is ID=5, value 6 to ID=11, value 20.

In some embodiments, ID=5 can be converted into a 32 bit value and the value of the 6 can be converted into a 32 bit value. The two 32 bit values can be concatenated to form a 64 bit value corresponding to the minimum value of group 1. ID=11 can be converted into a 32 bit value and the value of the 20 can be converted into a 32 bit value. The two 32 bit values can be concatenated to form a 64 bit value corresponding to the maximum value of group 1. This process can be repeated from both the minimum and the maximum values of groups 2-4. The minimum and maximum values of each group can form a query range.

Figure 6:
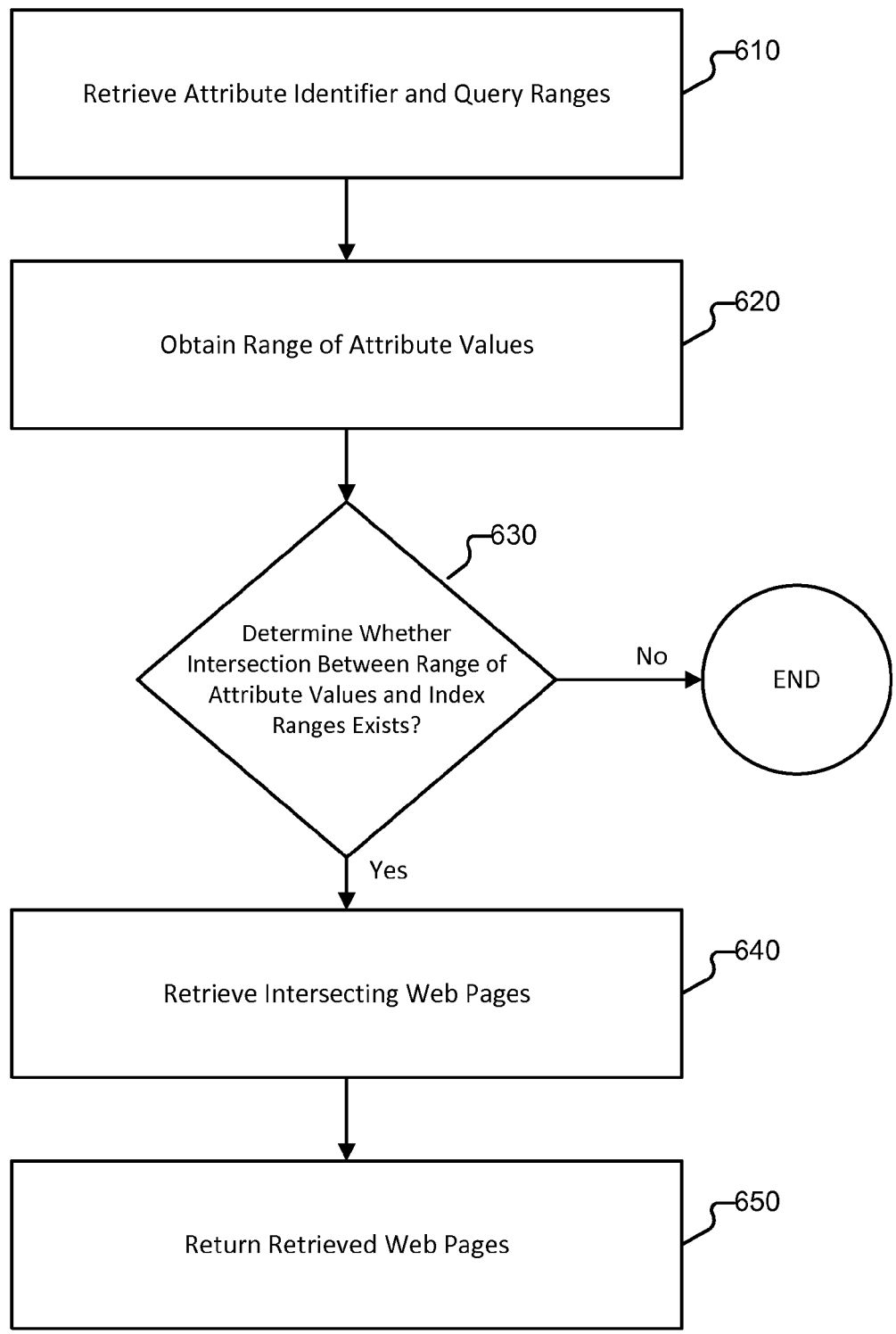
FIG. 6 is a flow chart illustrating an embodiment of a web page retrieval method.

FIG. 6 is a flow chart illustrating an embodiment of a web page retrieval method. The web page retrieval method 600 can be implemented on, for example, any of the web page retrieval devices 100, 200, 300, 400, or 500 illustrated in FIGS. 1-5. The method 600 comprises:

In 610, a device is configured to retrieve an attribute identifier of a web page to be retrieved and a query range related to the attribute identifier, based on an inputted query. For example, the inputted query may be obtained by a user's selection from a pull-down menu provided by a web page for conducting a search. For example, assume the user chooses to look up a product having a "price" attribute of "25-60," based on previously defined mapping relationships, the attribute identifier corresponding to "price" is id=1 and the query range relating to the attribute identifier is "25-60" can be obtained.

In 620, the device is configured to obtain a range of attribute values to be retrieved based on the attribute identifier of the web page to be retrieved and the query range related to the attribute identifier. In some embodiments, the range of attribute values to be retrieved can be obtained by multiplying the attribute identifier of the web page to be retrieved and the query range related to the attribute identifier.

In 630, the device is configured to determine whether an intersection between the range of attribute values to be retrieved and a plurality of index ranges established in advance in the device receiving the query exists. Assuming that the device has previously divided the index ranges used for a plurality of attribute searches into the ranges of "0-15", "16-50," "51-100", and "101-300," for the range of attribute values to be retrieved of "25-60," the intersecting index ranges correspond to "16-50" and "51-100."

In 640, the device is configured to in the event that the intersection between the range of the attribute values to be retrieved and the plurality of index ranges exists, retrieve a web page in an intersecting index range, the web page having an attribute identifier corresponding to the attribute identifier of the web page to be retrieved and the query range intersecting attribute value of the web page in the intersecting index range. For example, from among all web pages relating to the index ranges of "16-50" and "51-100," one or more web pages having the attribute identifier id=1 and having an intersection between the attribute values to be retrieved and the query range "25-60" can be retrieved.

In 650, the device is configured to return the retrieved one or more web pages as the retrieval results.

The attribute identifier of the web page to be retrieved can relate to one of query condition. The range of the attribute values to be retrieved can be obtained based on the attribute identifier of the web pages to be retrieved and the query range. The obtained range of the attribute values relates to a first screening. In other words, the first screening includes selecting from among a device's predetermined index ranges, the index ranges having an intersection with the range of attribute values to be retrieved, and selecting one or more web pages that correspond to the intersecting index ranges. A second screening can be performed including identifying which web pages among the selected web pages satisfy both of the query conditions relating to the product identifier and the query range to be output as the retrieval results. The index ranges established in advance by the device are no longer established with respect to any single attribute. Instead, the attribute identifier serves as one of the factors considered in the establishment of the index ranges, so that the index ranges can be established regarding a plurality of attributes. In other words, making unified queries within a set of web pages having different attributes is possible, unlike in conventional methods. Conventional methods make queries within only the same attribute. Thus, when a web page that is newly stored in the device possesses an attribute not possessed by the other previously stored web pages, adding a corresponding field to each existing web page to record the attribute is not required. Accordingly, data redundancy and waste of system resources caused when retrieving non-generic attributes are reduced when retrieving a range of attributes.

Furthermore, the attribute values of a product correspond to one of the factors in establishing mapping relationships between index ranges and web pages.

Figure 7:
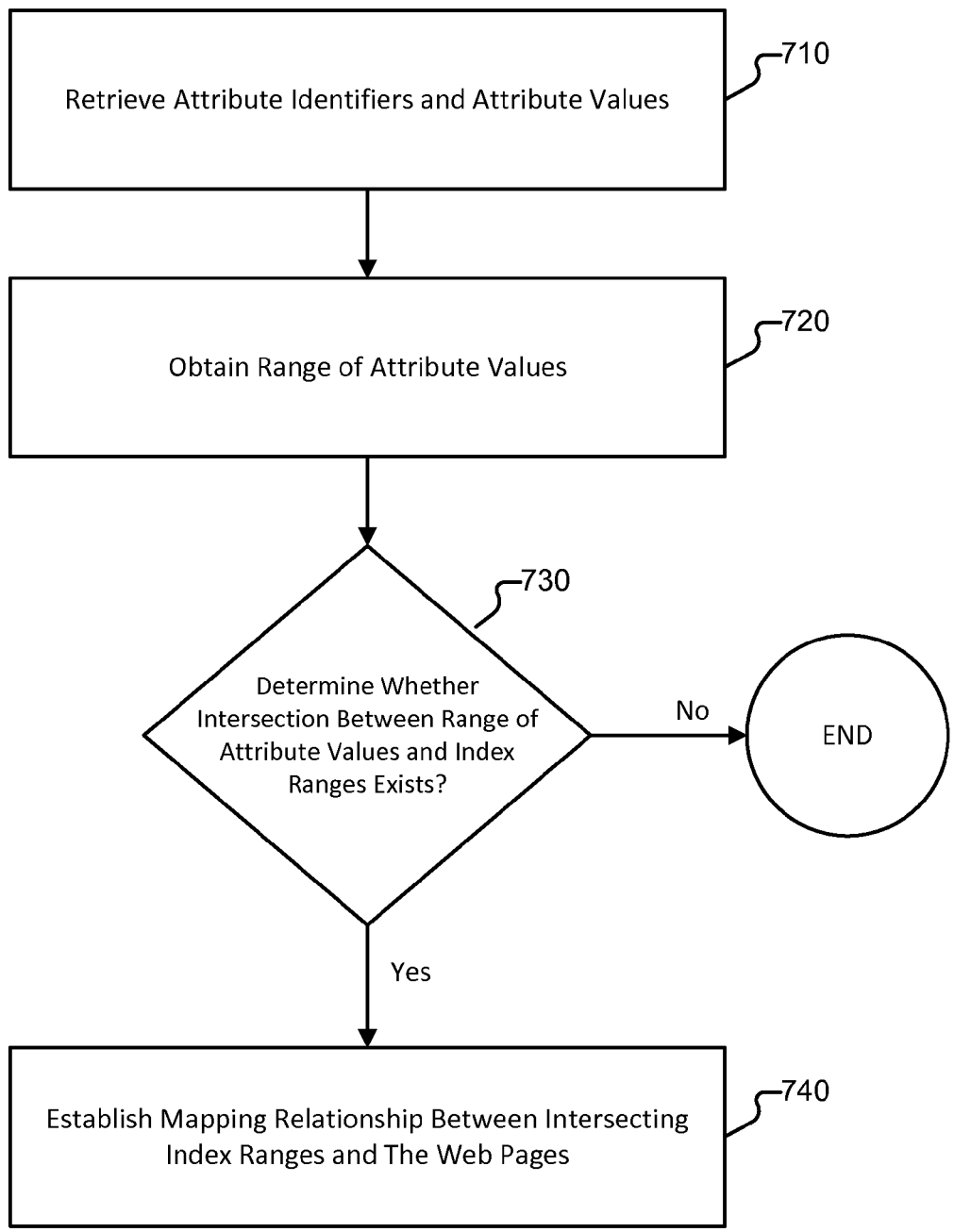
FIG. 7 is a flow chart illustrating an embodiment of a method of establishing a mapping relationship between index ranges and web pages in advance.

FIG. 7 is a flow chart illustrating an embodiment of a method of establishing a mapping relationship between index ranges and web pages in advance. The method 700 can be implemented on, for example, any of the web page retrieval devices 100, 200, 300, 400, or 500 illustrated in FIGS. 1-5. The method 700 comprises:

In 710, a device is configured to retrieve attribute identifiers and attribute values of web pages to be processed. For example, the web pages to be processed can be web pages stored in a website server (which may be referred to as a system).

In 720, the device is configured to obtain of a range of the attribute values of the web pages to be processed based on the attribute identifiers and the attribute values of the web pages to be processed.

In 730, the device is configured to determine whether an intersection between the range of attribute values of the web pages to be processed and a plurality of index ranges established in advance by the device exists.

In 740, the device is configured to in the event that the intersection exists, establish mapping relationships between intersecting index ranges and the web pages to be processed. In the event that the intersection does not exist, the process ends.

For example, assuming that the device has previously divided the index ranges used for one or more attribute searches into the ranges of "0-15", "16-50," "51-100", and "101-300," and web pages A, B, and C to be processed all possess the attribute of price, and web page A further includes the attribute of inside diameter. As shown in Table 1 below, the attribute identifier of price corresponds to id=1, and the attribute identifier of inside diameter corresponds to id=2. The attribute value of price in web page A corresponds to 5-10, the attribute value of inside diameter in web page A corresponds to 45-60, the attribute value of price in web page B corresponds to 40-55, and the attribute value of price in web page C corresponds to 100. Also, the attribute identifier of inside diameter corresponds to id=2 and the attribute value of inside diameter in web page A is 45-60. Other values can be set in other embodiments.

TABLE 1

| | Attribute value of price (id = 1) | Attribute value of inside diameter (id = 2) | Index ranges that intersect with the mapped range of attribute values |
|---|---|---|---|
| Web page A | 5-10 | 45-60 | "0-15", "51-100", "101-300" |
| Web page B | 40-55 | No such value | "16-50", "51-100" |
| Web page C | 100 | No such value | "51-100" |

The range of attribute values can be obtained by multiplying the attribute identifier with the attribute value of the attribute identifier of the web pages to be processed. A determination whether an intersection between the range of attribute values obtained and the index ranges exists. Mapping relationships can be established between the corresponding index ranges and the web pages for which the intersection between the range of attribute values and the corresponding index ranges exists.

The corresponding relationships shown in Table 2 below can be obtained through the above steps. For example, the range of the attribute values of price of the product displayed on web page A corresponds to 5-10, and the range of the attribute values of inside diameter of the product displayed on web page A corresponds to 90-120. Therefore, an intersection between the range of attribute values of web page A and the index ranges of "0-15", "51-100", and "101-300" exists. Mapping relationships are established between the index ranges of "0-15", "51-100", and "101-300" and web page A. The mapping relationships described above will be used in subsequent retrieval steps.

In this example, the attribute identifier (id) is multiplied by the attribute value to correspond to the range of attribute values.

TABLE 2

| Index range | Web pages included in range |
|---|---|
| "0-15" | Web page A |
| "16-50" | Web page B |
| "51-100" | Web page A, web page B, web page C |
| "101-300" | Web page A |

A bitmap index technique can be used to establish mapping relationships between the index ranges and the web pages. An index file of a bitmap index can include: index header information, a range information, and an index. A bitmap data file can be an array with each element of the array being a bit array of the bitmap index corresponding to one range. The length of each element (bit array) of the array is the same, and the length of each element (bit array) of the array is at least the quantity of indexed web pages. The number of arrays in the bitmap index corresponds to the number of ranges.

The index header information includes descriptive information of the bitmap index file. For example, the descriptive information can be the number of web pages for which indices have already been established and the number of index ranges. The range information can be an array. For example, each element of the array includes the following four fields: the minimum value of the index range (64 bits), the maximum value of the index range (64 bits), the number of web pages encompassed by the index range, and the offset of the bitmap index data of the index range in the data files of the bitmap index. The index can be an array. For example, as described above, for three web pages, A, B, and C, each index range correspondingly has an index composed of three bits where the first bit from left to right in each index indicates whether web page A falls within the index range, the second bit from left to right in each index indicates whether web page B falls within the index range, and the third bit from left to right in each index indicates whether web page C falls within the index range. A bit value of "0" can indicate that the corresponding web page does not fall within the index range, and a bit value of "1" can indicate that the corresponding web page falls within the index range. For example, the index corresponding to the index range "0-15" is 100, indicating that web page A falls within the index range, and web pages B and C do not fall within the index range because the first bit is "1" and the second and third bits are "0." The index corresponding to the index range "16-50" is 010 indicating that web page B falls within the index range, and web pages A and C do not fall within the index range. The index corresponding to the index range "51-100" is 111, indicating that web pages A, B, and C fall within the index range.

When a web page retrieval technique is performed, the attribute values (query range) and the attribute identifier of the web page to be retrieved are first retrieved based on the inputted query, and the same operations described above are performed on the aforesaid retrieved attribute value and attribute identifier to obtain the range of attribute values.

For example, in a query of products having a price within 25-60, the attribute values of 25-60 can be multiplied by the attribute identifier 1 to obtain a range of attribute values corresponding to 25-60. An intersection between the range of attribute values and the index ranges of "16-50" and "51-100" exists. Therefore, the web pages contained in the bitmap indices corresponding to the two index ranges of "16-50" and "51-100" are retrieved. Because web page B is in the index range "16-50" and web pages A, B, and C are in the index range "51-100," web pages A, B, and C are outputted as a first results set.

Subsequently, a search is performed regarding web pages A, B, and C, to determine whether web pages exist having the attribute identifier (id) corresponding to 1 and the attribute values fall within the query's attribute value of 25-60. In the event that the attribute identifier of web page B corresponds to 1, and an intersection between its attribute values of 40-55 and the query's attribute values of 25-60 exists, web page B is returned as a retrieval result. Thus, the user received the result in the queried price range.

As an example, for a query of products having an inside diameter value corresponding to 48, the query's attribute identifier for inside diameter corresponds to 2, and the attribute value of the inside diameter corresponds to 48 and the attribute identifier are multiplied to obtain a range of attribute values corresponding to 96. An intersection between the range of attribute values and the index range "51-100" exists. The web pages contained in a bitmap index corresponding to the index range "51-100" are retrieved, whereupon web page A is outputted as the first results set.

A search is performed regarding web page A to determine whether the attributes present include an attribute identifier of 2, and whether an intersection between the attribute values corresponding to this attribute identifier and 48 exist. Based on the search, web page A is outputted as the final retrieval result. Thus, a retrieval relating to non-generic attributes is performed.

An operation is performed above on the attribute identifier and the attribute values to obtain a corresponding range of attribute values. Thus, a mapping of the index range is performed to no longer target a specific fixed attribute, but instead to target all attributes. In this example, if the attribute does not exist, the relevant mapping is only performed with respect to a range. Thus, a unification of generic attributes and non-generic attributes in the query and retrieval processes is achieved, reducing data redundancy.

The obtaining of the range of attribute values of the web pages to be processed based on the attribute identifier and the attribute values of the web pages to be processed can include: Hashing of the attribute identifier and the attribute values of the web pages to be processed to obtain a range of attribute values of the web pages to be processed.

The obtaining of the range of attribute values of the query based on the attribute identifier of the query and the query range can include: Hashing of the attribute identifier of the query and the query range to obtain the range of attribute values of the query.

In some embodiments, in the search engine's web pages to be processed, generic attributes can be stored using character strings, while user-defined attributes can be stored using Extensible Markup Language (XML) formatting. In some embodiments, the XML formatted user-defined attribute files can be parsed to obtain the attribute identifier and the attribute values.

In some embodiments, the determining of the index ranges can include: the cumulative offset information is included in an array, where the information stored in the cumulative offset information corresponds to orientation information concerning the third portion of the attribute information. Using the web page id as the subscript, the sum of the number of bytes of the self-defined attribute information of all previous web pages up through the id number of each web page can be recorded.

Figure 8:
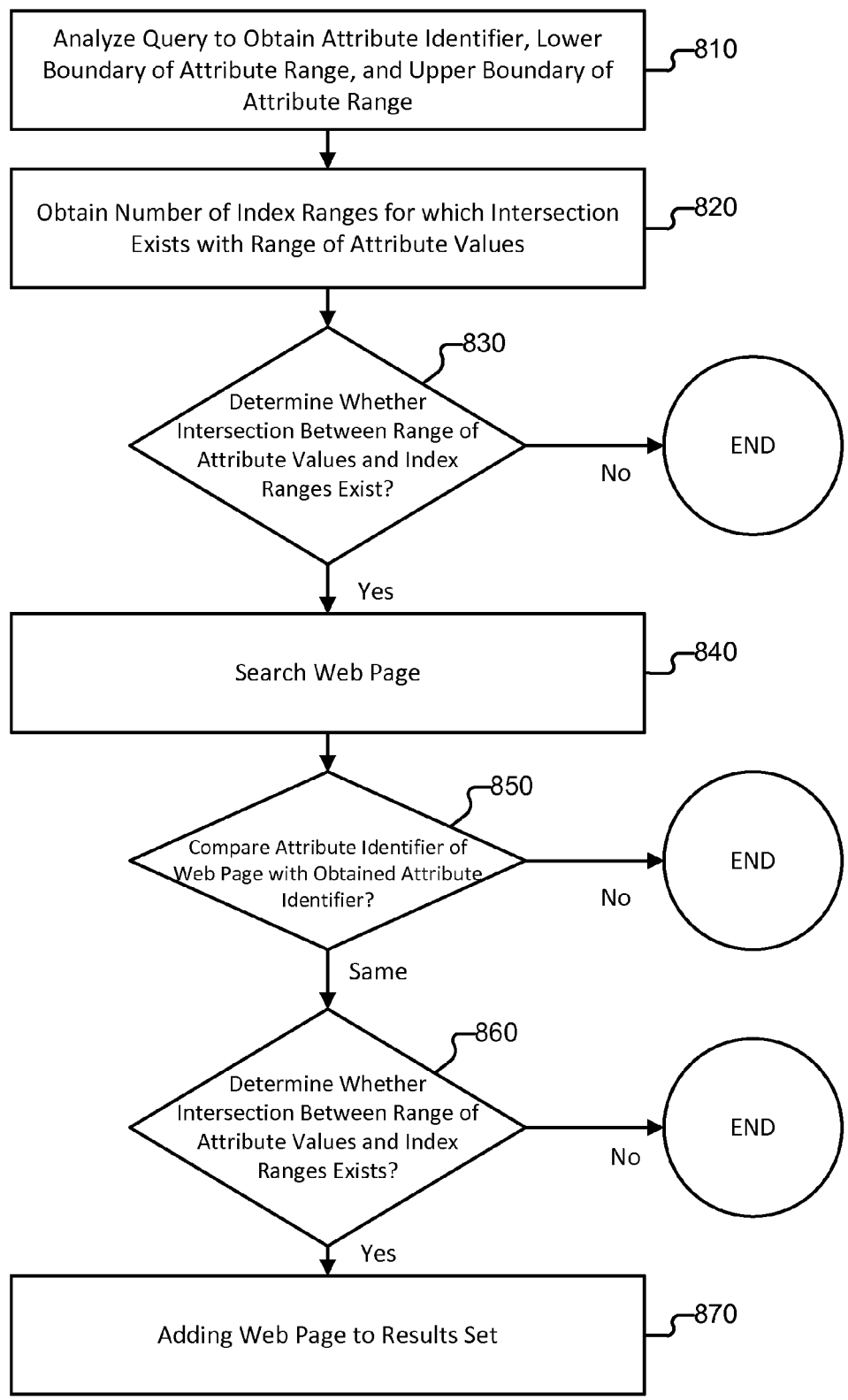
FIG. 8 is a flow chart illustrating yet another embodiment of a web page retrieval method.

FIG. 8 is a flow chart illustrating yet another embodiment of a web page retrieval method. The web page retrieval method 800 can be implemented on, for example, any of the web page retrieval devices 100, 200, 300, 400, or 500 illustrated in FIGS. 1-5. The web page retrieval method 800 comprises:

In 810, a device is configured to analyze a user-inputted query to obtain an attribute identifier, a lower boundary of an attribute range of the attribute identifier, and an upper boundary of the attribute range of the attribute identifier. The attribute identifier corresponds to an attribute type that can be retrieved based on the attribute type selected by the user. For example, attribute types capable of being selected by the user on web pages can include: price, date of manufacturer, and inside diameter. In the event that the user chooses to query products in the range of "25-60" of the "price" attribute, the device can obtain the attribute identifier id=1 corresponding to the "price" attribute, and the query range of "25-60" for the attribute identifier, where the lower boundary of the attribute range corresponds to 25, and the upper boundary of the attribute range corresponds to 60.

In 820, the device is configured to obtain a number of index ranges for which an intersection exists with the range of attribute values to be retrieved based on a comparison of the obtained upper and lower boundaries of the range and the index ranges. Based on the obtained number of index ranges, a corresponding set of web pages can be obtained.

In some embodiments, the range of attribute values to be retrieved can be first obtained based on the attribute identifier of the web pages to be retrieved and the query range. In some embodiments, the attribute identifier of the web pages to be retrieved can be multiplied with the query range to obtain the range of attribute values to be retrieved. For example, when the attribute identifier corresponds to id=1 and the query range corresponds to "25-60," a range of attribute values to be retrieved corresponding to "25-60" can be obtained using the multiplying operation. In another example, when the attribute identifier corresponds to id=2 and the query range corresponds to "25-60," a range of attribute values to be retrieved corresponding to "50-120" can be obtained using the multiplying operation.

In 830, the device is configured to determine whether an intersection between the range of the attribute values to be retrieved and a plurality of index ranges established in advance in the device receiving the query, and identify web pages whose index ranges intercept with the range of attribute values to be retrieved. Assuming that the device has divided the index ranges used for the retrieval of a plurality of attributes into the ranges of "0-15," "16-50," "51-100," and "101-300," an intersection between the range of attribute values to be retrieved of "25-60" and the index ranges of "16-50" and "51-100" exists.

In 840, the device is configured to search a web page contained in the web pages obtained in the intersection and based on the cumulative offset information in a filter index file, find the user-defined attribute identifiers and attribute values corresponding to the web page.

In some embodiments, the filter index file includes: index header information, cumulative offset information and a user-defined attribute information block. The index header information includes descriptive information relating to the index file, the cumulative offset information corresponds to an array storing orientation information relating to the user-defined attribute information block, using the web page attribute address as the subscript for the array relating to the cumulative offset information, to record the sum of the number of bytes of the user-defined attribute information of all previous web pages up through the address number of each web page, and the user-defined attribute information block can include all user-defined attribute information, which may include a plurality of items. Each item can include the attribute address and the attribute value. The attribute value can be a discrete value or numerical range. In some embodiments, a lowest bit of 0 for an attribute address can indicate that the attribute value is a discrete value, and a lowest bit of 1 for an attribute address can indicate that the attribute value is a range. Each item can correspond to one user-defined attribute and one web page can simultaneously have a plurality of user-defined attributes. In other words, the plurality of user-defined attributes can correspond to a plurality of items.

In 850, the device is configured to compare an attribute identifier of a web page where the user-defined attribute is present and the obtained attribute identifier from the query. In some embodiments, the device can compare each web page where the user-defined attribute is present.

In the event that the attribute identifiers are different, no further action is required.

In 860, in the event that the attribute identifiers are the same, the device is configured to determine whether an intersection between the attribute value and the attribute value of the query exists.

In the event that the intersection does not exist, no further action is required.

In 870, in the event that an intersection between the attribute value and the attribute value of the query exists, the device is configured to add the web page into a results set, and the obtained results set becomes the user query result, the device is configured to add the web page into a results set, and the obtained results set becomes the user query result.

Steps 840-870 are repeated until all the web pages identified in step 820 are processed.

By using the attribute identifier of the web pages to be retrieved as a query condition, the range of attribute values to be retrieved is obtained based on the attribute identifier of the web pages to be retrieved and the query range. Thus, a first screening can be performed, i.e., selecting from among the system's predetermined index ranges of the index ranges for which an intersection with the range of attribute values to be retrieved exists, and selecting web pages that correspond to the intersecting index ranges. Furthermore, a second screening can be performed by identifying which web pages among the selected web pages satisfy both of the query conditions of attribute identifier and query range, to be output as retrieval results. As described above, the index ranges established in advance by the system are no longer established regarding a single particular attribute. Instead, the attribute identifier relate to one of the factors considered in the establishment of the index ranges, so that the index ranges are established relating to a plurality of attributes. In other words, making unified queries within a set of web pages that have different attributes is possible unlike in conventional queries, where queries are made within the same attribute. Thus when a web page that is newly stored in the system possesses an attribute not possessed by the other previously stored web pages, adding a corresponding field for each existing web page to record this attribute is not needed. Accordingly, data redundancy and waste of system resources is reduced when retrieving non-generic attributes. Additionally, the attribute identifier id is used as one of the query conditions, and queries are performed utilizing the attribute identifier and query range computation results in the system's predetermined index ranges, unlike conventional queries, which rely on retrieving keywords from the query to perform matching queries of attributes contained in the system, followed by queries of the query range. Thus, the speed of queries is increased.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A web page retrieval method, comprising:
   receiving an inputted query;
   retrieving an attribute identifier of a web page to be retrieved and a query range related to the attribute identifier, based on the inputted query;
   obtaining, using a processor, a range of attribute values to be retrieved based on the attribute identifier of the web page to be retrieved and the query range, wherein the range of attribute values includes a plurality of values;
   determining, using the processor, that an intersection between the range of attribute values to be retrieved and a plurality of pre-established index ranges exists, wherein the plurality of preset-established index ranges correspond to ranges for an index of attribute values to which a plurality of attributes are mapped;
   retrieving a web page relating to the intersecting index range, the attribute identifier of the web page corresponding to the attribute identifier of the web page to be retrieved, and the attribute values relating to the attribute identifier of the web page intersecting the query range; and
   in response to retrieving the web page, the attribute identifier and the attribute values, returning the retrieved web page as retrieval results.

2. The method as described in claim 1, further comprising prior to the retrieving of the attribute identifier of the web page to be retrieved and the query range related to the attribute identifier based on the inputted query:
   retrieving attribute identifiers and attribute values of web pages to be processed;
   obtaining a range of attribute values of the web pages to be processed based on the attribute identifiers and the attribute values of the web pages to be processed;
   determining whether an intersection between the range of attribute values of the web pages to be processed and the plurality of index ranges established in advance exists; and
   in the event that the intersection exists, establishing mapping relationships between intersecting index ranges and the web pages to be processed.

3. The method as described in claim 2, wherein the obtaining of the range of attribute values of the web pages to be processed based on the attribute identifiers and the attribute values of the web pages to be processed comprises:
hashing the attribute identifiers and the attribute values of the web pages to be processed to obtain the range of attribute values of the web pages to be processed.

4. The method as described in claim 1, wherein the obtaining of the range of attribute values to be retrieved based on the attribute identifiers of the web pages to be retrieved and the query range comprises:
   hashing the attribute identifiers of the web pages to be retrieved and the query range to obtain the range of attribute values of the web pages to be retrieved.

5. The method as described in claim 1, wherein the attribute values correspond to discrete values or predetermined numerical ranges.

6. The method as described in claim 1, further comprising:
   establishing the plurality of pre-established index ranges comprising:
      sorting webpages based on attribute values and attribute identifiers of the webpages;
      dividing the sorted webpages into a plurality of ranges; and
      for each range, identifying webpages having the minimum and maximum values based on the attribute values and the attribute identifiers of the sorted webpages.

7. The method of claim 1, wherein the index of attribute values to which a plurality of attribute values are mapped is a unified index that can be queried for queries relating to a set of web pages having different attributes.

8. The method of claim 1, wherein each of the plurality of attributes are respectively mapped to the index of attribute values by multiplying an attribute identifier by a corresponding attribute value.

9. A web page retrieval device, comprising:
   at least one processor configured to:
      receive an inputted query;
      retrieve an attribute identifier of a web page to be retrieved and a query range related to the attribute identifier, based on the inputted query;
      obtain a range of attribute values to be retrieved based on the attribute identifier of the web page to be retrieved and the query range, wherein the range of attribute values includes a plurality of values;
      determine that an intersection between the range of attribute values to be retrieved and a plurality of pre-established index ranges exists, wherein the plurality of preset-established index ranges correspond to ranges for an index of attribute values to which a plurality of attributes are mapped;
      retrieve a web page relating to the intersecting index range, the attribute identifier of the web page corresponding to the attribute identifier of the web page to be retrieved, and the attribute values relating to the attribute identifier of the web page intersecting the query range; and
      in response to retrieving the web page, the attribute identifier, and the attribute values, return the at least one retrieved web page as retrieval results; and
   a memory coupled to the at least one processor and configured to provide the at least one processor with instructions.

10. The device as described in claim 9, wherein the at least one processor is configured to:
   prior to the retrieve of the attribute identifier of the web page to be retrieved and the query ranges relating to the attribute identifier based on the inputted query:
      retrieve attribute identifiers and attribute values of web pages to be processed;

obtain a range of attribute values of the web pages to be processed based on the attribute identifiers and the attribute values of the web pages to be processed;

determine whether an intersection between the range of attribute values of the web pages to be processed and the plurality of index ranges established in advance exists; and in the event that the intersection exists, establish mapping relationships between intersecting index ranges and the web pages to be processed.

11. The device as described in claim 10, wherein the obtain of the range of attribute values of the web pages to be processed based on the attribute identifiers and the attribute values of the web pages to be processed comprises:

hash the attribute identifiers and the attribute values of the web pages to be processed to obtain the range of attribute values of the web pages to be processed.

12. The device as described in claim 9, wherein the obtain of the range of attribute values to be retrieved based on the attribute identifiers of the web pages to be retrieved and the query range comprises:

hash the attribute identifiers of the web pages to be retrieved and the query range to obtain the range of attribute values of the web pages to be retrieved.

13. The device as described in claim 9, wherein the attribute values correspond to discrete values or predetermined numerical ranges.

14. A computer program product for retrieving a web page, the computer program product being embodied in a non-transitory computer readable storage medium and comprising computer instructions for:

receiving an inputted query;

retrieving an attribute identifier of a web page to be retrieved and a query range related to the attribute identifier, based on the inputted query;

obtaining a range of attribute values to be retrieved based on the attribute identifier of the web page to be retrieved and the query range, wherein the range of attribute values includes a plurality of values;

determining that an intersection between the range of attribute values to be retrieved and a plurality of pre-established index ranges exists, wherein the plurality of preset-established index ranges correspond to ranges for an index of attribute values to which a plurality of attributes are mapped;

retrieving a web page relating to the intersecting index range, the attribute identifier of the web page corresponding to the attribute identifier of the web page to be retrieved, and the attribute values relating to the attribute identifier of the web page intersecting the query range; and in response to retrieving the web page, the attribute identifier, and the attribute values, returning the retrieved web page as retrieval results.

15. The computer program product as described in claim 14, further comprising prior to the retrieving of the attribute identifier of the web page to be retrieved and the query ranges relating to the attribute identifier based on the inputted query:

retrieving attribute identifiers and attribute values of web pages to be processed;

obtaining a range of attribute values of the web pages to be processed based on the attribute identifiers and the attribute values of the web pages to be processed;

determining whether an intersection between the range of attribute values of the web pages to be processed and the plurality of index ranges established in advance exists; and in the event that the intersection exists, establishing mapping relationships between intersecting index ranges and the web pages to be processed.

16. The computer program product as described in claim 15, wherein the obtaining of the range of attribute values of the web pages to be processed based on the attribute identifiers and the attribute values of the web pages to be processed comprises:

hashing the attribute identifiers and the attribute values of the web pages to be processed to obtain the range of attribute values of the web pages to be processed.

17. The computer program product as described in claim 14, wherein the obtaining of the range of attribute values to be retrieved based on the attribute identifiers of the web pages to be retrieved and the query range comprises:

hashing the attribute identifiers of the web pages to be retrieved and the query range to obtain the range of attribute values of the web pages to be retrieved.

18. The computer program product as described in claim 14, wherein the attribute values corresponds to discrete values or predetermined numerical ranges.

19. A web page retrieval method, comprising:

analyzing a user-inputted query to obtain an attribute identifier, a lower boundary of an attribute range of the attribute identifier, and a upper boundary of the attribute range of the attribute identifier;

obtaining a number of index ranges for which an intersection exists with a range of attribute values to be retrieved based on a comparison of the obtained upper and lower boundaries of the range and the index ranges, wherein the range of attribute values includes a plurality of values;

determining, using a processor, that an intersection between the range of the attribute values to be retrieved and a plurality of pre-established index ranges exists, wherein the plurality of preset-established index ranges correspond to ranges for an index of attribute values to which a plurality of attributes are mapped;

searching, using the processor, web pages obtained in the intersection and based on cumulative offset information in a filter index file, to find a web page having the user-defined attribute identifiers and attribute values;

comparing, using the processor, attributes values of the web page that correspond to a user-defined attribute identifier included with the web page to the attribute value of the query;

determining that an intersection between the attribute value of the web page and the attribute value of the query exists; and adding the web page into a results set.

20. A computer program product for retrieving a web page, the computer program product being embodied in a non-transitory computer readable storage medium and comprising computer instructions for:

analyzing a user-inputted query to obtain an attribute identifier, a lower boundary of an attribute range of the attribute identifier, and a upper boundary of the attribute range of the attribute identifier;

obtaining a number of index ranges for which an intersection exists with a range of attribute values to be retrieved based on a comparison of the obtained upper and lower boundaries of the range and the index ranges, wherein the range of attribute values includes a plurality of values;

determining that an intersection between the range of the attribute values to be retrieved and a plurality of pre-established index ranges exists, wherein the plurality of preset-established index ranges correspond to ranges for an index of attribute values to which a plurality of attributes are mapped;

searching web pages obtained in the intersection and based on cumulative offset information in a filter index file, to find a web page having the user-defined attribute identifiers and attribute values;

comparing attributes values of the web page that correspond to a user-defined attribute identifier included with the web page to the attribute value of the query;

determining that an intersection between the attribute value of the web page and the attribute value of the query exists; and adding the web page into a results set.

\* \* \* \* \*